US008347376B2

(12) United States Patent
Weis et al.

(10) Patent No.: US 8,347,376 B2
(45) Date of Patent: Jan. 1, 2013

(54) TECHNIQUES FOR DISTRIBUTING A NEW COMMUNICATION KEY WITHIN A VIRTUAL PRIVATE NETWORK

(75) Inventors: Brian E. Weis, San Jose, CA (US); Shashi Sastry, Palo Alto, CA (US); Sheela Dixit Rowles, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1358 days.

(21) Appl. No.: 11/369,358

(22) Filed: Mar. 6, 2006

(65) Prior Publication Data

US 2007/0209071 A1  Sep. 6, 2007

(51) Int. Cl.
 *G06F 15/163* (2006.01)
 *H04L 9/08* (2006.01)
 *H04L 9/30* (2006.01)
 *G06F 17/30* (2006.01)
(52) U.S. Cl. .......... 726/15; 380/277; 380/278; 380/279; 709/224
(58) Field of Classification Search .......... 380/277–279; 726/15; 709/224
 See application file for complete search history.

(56) References Cited

U.S. PATENT DOCUMENTS

| 5,706,348 | A  | * | 1/1998 | Gray et al. ............... 713/160 |
| 6,038,322 | A  | * | 3/2000 | Harkins .................. 380/279 |
| 6,295,361 | B1 | * | 9/2001 | Kadansky et al. .......... 380/278 |
| 7,366,894 | B1 | * | 4/2008 | Kalimuthu et al. ......... 713/153 |
| 7,509,491 | B1 | * | 3/2009 | Wainner et al. ........... 713/163 |

OTHER PUBLICATIONS

W. Richard Stevens "TCP/IP Illustrated, vol. 1" Nov. 2001, Addison Wesley. vol. 1, pp. 34, 224-225, 298-299.*
Labonte, Christian et al. "Group Management Strategies for Secure Multicasting on Active Virtual Private Networks", 2000 IEEE.*
Rodeh, Ohad et al. "Dynamic Virtual Private Networks", 1998.*

* cited by examiner

*Primary Examiner* — Michael Simitoski
(74) *Attorney, Agent, or Firm* — Schwegman, Lundberg & Woessner, P.A.

(57) ABSTRACT

Techniques for distributing a new communication key within a group virtual private network (VPN) are provided. A key distribution service determines that a new communication key for a VPN is to be distributed to members of the VPN. The new communication key is sent individually in a unique and separate message to each of the members. The key distribution service also maintains records to determine which of the members have and have not successfully received the new communication key.

14 Claims, 5 Drawing Sheets

US 8,347,376 B2

TECHNIQUES FOR DISTRIBUTING A NEW COMMUNICATION KEY WITHIN A VIRTUAL PRIVATE NETWORK

FIELD

The invention relates generally to network communications and more particularly to security associated with communications within a virtual private network (VPN).

BACKGROUND

A Virtual Private Network (VPN) is a logical network that uses insecure public telecommunications, such as the Internet, to provide secure communications to members of the VPN. A VPN seeks to provide the security associated with dedicated communication lines but without requiring the necessary hardware and at a fraction of the cost, which is typically associated with dedicated communication lines.

A VPN works by using shared public infrastructure while simultaneously maintaining privacy through agreed upon security procedures and protocols. Essentially, a VPN uses custom encryption to encrypt messages communicated via the VPN. The encryption and decryption of messages rely upon keys that are securely held by participants of the VPN.

Typically, it is not desirable for a particular VPN communication key to remain unchanged for any extended period of time. This is so, because the longer a key is detectable over the shared public infrastructure, the more likely an intruder will have a chance to discover the key. Consequently and pursuant to configurations or detected events, the communication key for a VPN will change over time with some regularity.

However, when the key is changed it has to be communicated to each of the participants of the VPN; otherwise, some participants will find that they are no longer capable of communicating within the VPN. The popular approach for communicating a changed key is to multicast the changed key to members of the VPN. With multicasting, the key is sent to all members of the VPN at once. Essentially for VPN rekeying techniques, multicasting may be viewed as selective broadcasting, since within the VPN the changed key is broadcast, but the changed key is not exposed to the entire shared public network.

Yet, not every network or sub network within the public infrastructure is capable of supporting multicasting. Consequently, the benefits of VPN and dynamic rekey distribution within a VPN are limited to participants that are accessible to sub networks, resources, and/or applications that support multicasting techniques. For multicasting to work a single packet has to be replicated for each intended recipient from a single stream or packet. Thus, the application and adoption of VPN techniques are currently circumscribed to participants and networks enabled for multicasting communications.

Therefore, improved techniques for distributing keys within a VPN are desirable.

DETAILED DESCRIPTION

Figure 1:
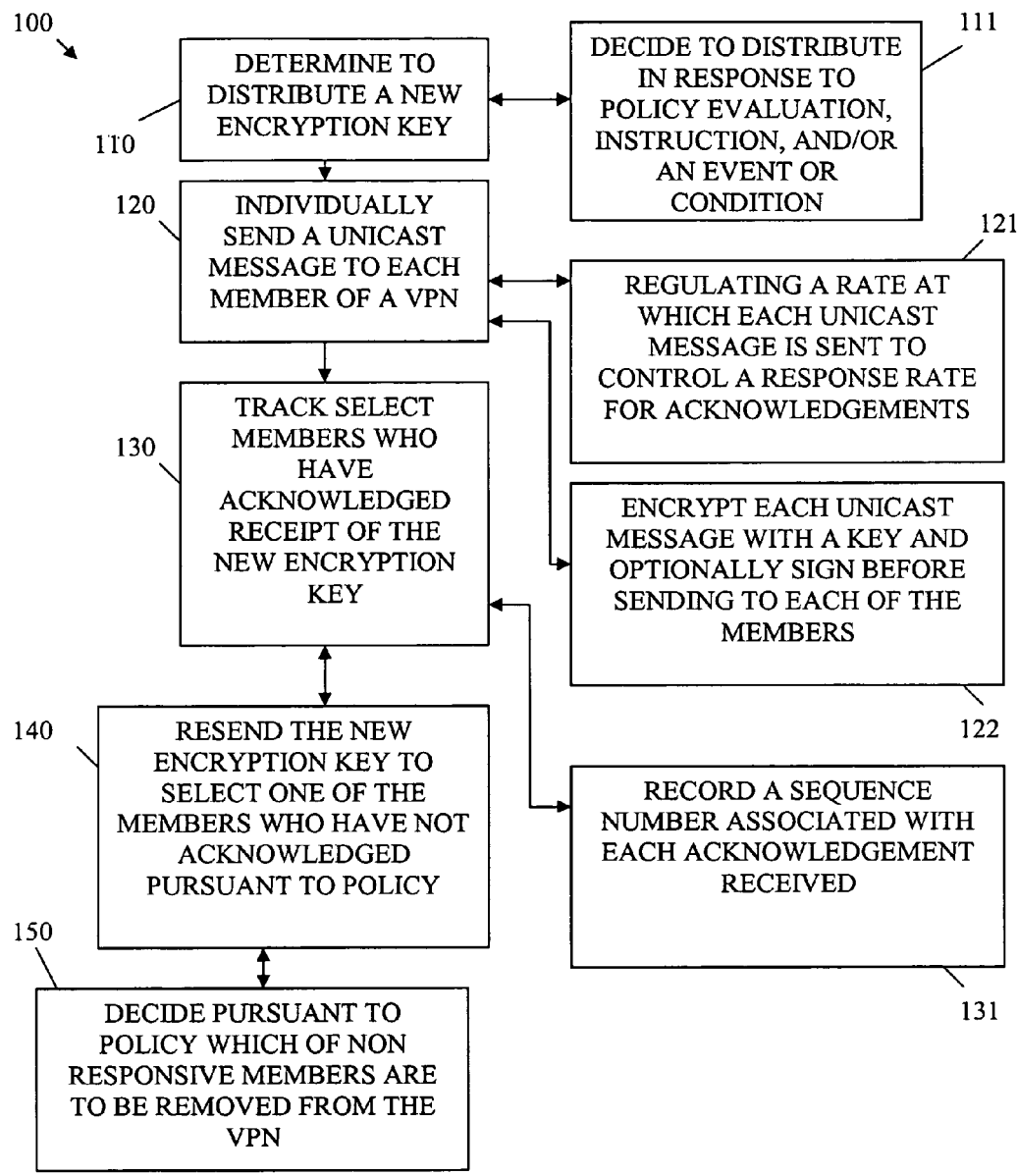
FIG. 1 is a diagram of a method for distributing a new communication key to members of a virtual private network (VPN), according to an example embodiment.

FIG. 1 is a diagram of a method 100 for distributing a new communication key to members of a virtual private network (VPN), according to an example embodiment. The method 100 (hereinafter "key distribution service") is implemented in a machine-accessible and readable medium and is operational over a network. The network may be wired, wireless, or a combination of wired and wireless. In an embodiment, the key distribution service is integrated within a network router or other network device. Alternatively, the key distribution service is loaded on a server over the network and accessible as a remote service to participants of the VPN.

Initially, the key distribution service monitors or manages one or more VPN's over the network. The key distribution service is responsible for communicating encryption keys changes used for communications within the VPN's. Accordingly, at 110, the key distribution service makes a determination to distribute a new encryption key to a particular VPN for which it is managing.

The VPN is a group VPN. That is, as used herein the "VPN" is not associated with point-to-point (P2P) connections. The group VPN may be any-to-any mesh configuration of devices.

In an embodiment, at 111, the key distribution service may decide to distribute a new encryption key in response to a variety of circumstances or situations. For example, a policy and its dynamic and real-time evaluation may indicate to the key distribution service that a new encryption key is desired or needed within the VPN. In other cases, an event may be detected or a condition may trigger the determination to generate and communicate a new encryption key. For example, an event may be raised by a particular member with proper authorization to trigger a particular event or condition for purposes of generating and communicating a new encryption key.

At 120, the key distribution service individually sends a unicast message to each member of the VPN. A unicast message is a message transaction in which a specific and custom message is sent to each individual member of the VPN. This may be viewed as a point-to-point communication between the key distribution service and each of the members of the VPN. Conventionally, a new key within a VPN would be communicated via a multicast communication; this approach may unduly waste processing power on members receiving and re-receiving new keys, some of which have been received and are no longer needed. Also, this approach may not be feasible for members that lack the proper network support for multicasting. Thus, the ability to unicast key changes to each individual member of the VPN provides for more efficient and more globally accessible approach.

In addition, at 121, since the key distribution service sends the new communication key via a unicast message, it may also regulate the rate at which each unicast message is sent. This rate at which messages are sent to the members can also be used as a mechanism to control the rate at which acknowledgements are received from the individual members. That is, the key distribution service can control the rate at which it has to respond and has to process acknowledgements for the individual members by controlling the rate at which the key distribution service sends the unicast messages out to each of the individual members. Policy may be enforced to determine the rate at which the unicast messages are sent out.

According to another embodiment, at 122, the key distribution service may also encrypt the unicast message and/or optionally digitally sign the unicast message. So, messages that communicate a new encryption key may be encrypted with an entirely different key that is known to the participants or members of the VPN or that can be derived based on policy information, such as time of day, parties involved, etc.

As one example, consider that a new key may be encrypted by the key distribution service using its own private key and a public key of a particular member who is to be the recipient of the unicast message. The encryption may also use the private key of the key distribution service and a key chain that includes public keys for all members of the VPN. When the targeted member receives the encrypted unicast message, the member uses its private key and the public key of the key distribution service to decrypt it and uncover the new VPN communication encryption key. It is to be understood that a variety of techniques may be used to communicate the new encryption key for the VPN using encryption that is different from or the same as the VPN and the example presented was provided for purposes of illustration only.

It should also be pointed out that in some cases, a public-private key pair maybe too costly in terms of processing time. Thus, in some embodiments, a shared secret key may be used and preconfigured with the members, such that all members share that secret encryption key for purposes of key distribution communications.

At 130, the key distribution service may actively track and monitor the members that have successfully acknowledged receipt of the new encryption key via the unicast message. In this manner, the key distribution service can determine at any particular point in time which members know the new encryption key and which do not know the new encryption key.

One technique, at 131, may be used where a particular message having the new encryption key is associated with a sequence number. That sequence number is affixed or associated with each individual unicast message. When an acknowledgement is received from a member, the IP address of that member is used to identify the member and the sequence number identifies the particular message that was being sent, which had the new encryption key.

The key distribution service may take a variety of actions in tracking and monitoring which members have and have not received the new encryption key. These actions may be driven by policy. The policies may be preconfigured or dynamically acquired for evaluation. As an example, consider that the key distribution service may send a unicast message and then set a timer for some configurable period of time. At the end of that time an alarm is triggered and the key distribution service wakes up again and determines if a given member has acknowledged receipt of the unicast message.

If no acknowledgement has been received, at 140, then policy may dictate that the new encryption key be resent to those members that have not acknowledged its receipt. This process may be repeated for some configurable number of iterations, and if at 150, at the conclusion of those iterations if there is one or more members that have still not acknowledged receipt of the new encryption key, then policy may dictate that any such members be permanently removed as valid members of the VPN. Procedures may permit members to rejoin the VPN after proper authentication and then subsequently acquire the new encryption key.

It is now understood how a key distribution service may take more active management and processing control of VPN rekeying. New communication keys are communicated via individual unicast messages that are sent to each member of the VPN from the key distribution service. The key distribution service can control its own rate of processing acknowledgments by controlling the rate at which the unicast messages are sent out initially. Moreover, the key distribution service enforces policy to manage when members may be deemed as having received the new encryption key and when members should be entirely removed from the VPN.

It should also be noted that if the number of group members within the VPN is large, the techniques presented may be iterated with smaller configured groups of the total group. This may be used when the rekey or unicast message having the new encryption key also includes relative time information (i.e., key lifetimes). So, if the process of sending unicast rekey messages takes more than one second, then some group members may believe the lifetime of the key is one second longer then the key distribution service intended it to be. Thus, it is to be understood that 120-130 are iterative and configurable processing actions for the key distribution service that may be taken in optimal manners some of which are taken pursuant to policies.

Figure 2:
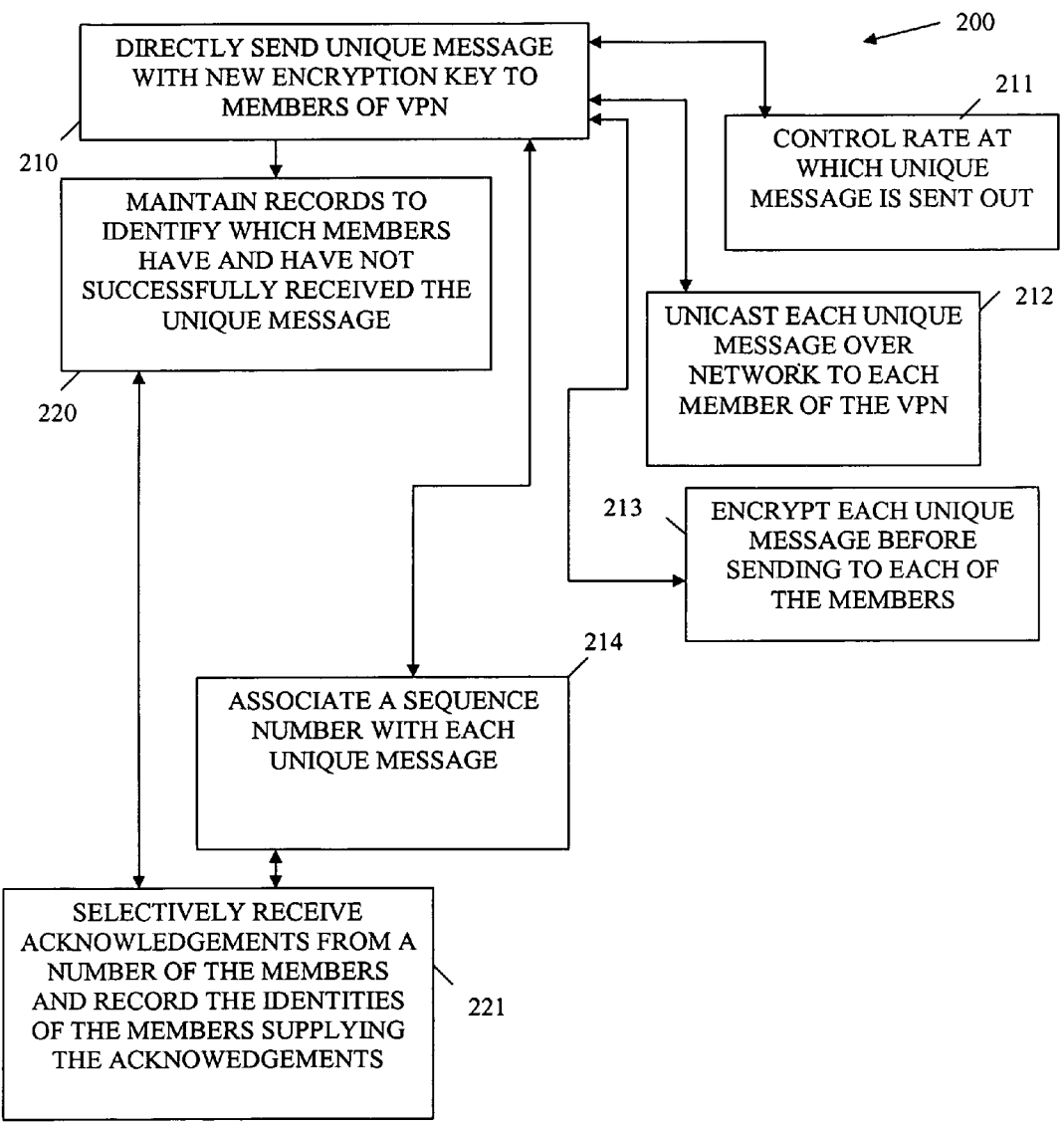
FIG. 2 is a diagram of another method for distributing a new communication key to members of a VPN, according to an example embodiment.

FIG. 2 is a diagram of another method 200 for distributing a new communication key to members of a VPN, according to an example embodiment. The method 200 is implemented as instructions within a machine-accessible and readable medium. The instructions when loaded, accessed, and processed by a machine perform the processing depicted in FIG. 2. The processing presents a different perspective to the method 100 of FIG. 1.

The instructions may be uploaded from removable medium to a machine and processed. Alternatively, the instructions maybe prefabricated within memory and/or storage of a machine. Still further, the instructions may be downloaded from the network from one machine to another machine for processing. In still another situation, the instructions may be processed on a remote machine of the network at the direction and control of another network machine.

At 210, the instructions directly send a unique message with a new encryption key to members of a VPN. The unique message is a point-to-point communication between the instructions and each member of the VPN. The unique message includes a new communication key for communicating over the VPN. That is, the new encryption key instructs the members to begin communicating (either immediately or at a particular point in time) over the VPN with the new encryption key.

According to an embodiment, the instructions may process as a key distribution service, such as the key distribution service represented by the method 100 and described within the context of the FIG. 1. So, similar to the discussion above, a variety of policy evaluations, events, and/or conditions may drive the initial desire of the instructions to send the unique message to each unique member of the VPN.

In an embodiment, at 211, the instructions may control the rate which each unique message is sent out to each of the members. So, policy enforcement and evaluation by the instructions may dictate the rate at which the unique messages are sent out to the members. The rate at which the messages are sent out will drive the rate at which acknowledgements are received and subsequently processed by the instructions. This essentially controls the load of the instructions and is driven and dictated by the instructions. Dynamic evaluation of conditions of the network in combination with policies may drive the determined rate at which the messages are sent out as well. Examples and discussions of this technique of controlling the rate at which messages are sent out to the members of the VPN were discussed and described above with respect to the key distribution service represented by the method 100 of the FIG. 1.

According to an embodiment, at 212, the instructions unicast each unique message over the network to each member of the VPN. Discussions with respect to unicasting were discussed above with the key distribution service represented by the method 100 of the FIG. 1.

Additionally and in some other cases, at 213, the instructions may encrypt each unique message before sending the messages to each of the members. Again, the encryption may be specific to each unique member or may be specific to the group of members as a whole. In some cases, the encryption may use public-private key encryption as we discussed above in detail with the key distribution service represented by the method 100 of the FIG. 1. The instructions may also use a shared secret key configured with and known to the members and used for communicating key changes over the network.

Furthermore, at 214, each new key message may include a sequence number. With the sequence number, the instructions can identify an acknowledgement as being associated with the new key message and can discover an identity of a particular member acknowledging the new key message from an IP address, which is obtained from the acknowledgement. So, if the instructions are managing multiple VPN's and key changes, when an acknowledgement is received, the proper VPN key change message may be identified from the sequence number associated with the acknowledgement and the identity of the VPN member is obtained from the IP address of the acknowledgement.

At 220, the instructions actively maintain and manage records to identify which members have and have not successfully received the unique messages. The instructions keep track of which members have acknowledged receipt of the unique message, which indicates that these acknowledging members have the new encryption key embodied in the unique message and are capable of communicating over the VPN with the new encryption. The instructions also keep track of which members have not acknowledged (non-responsive members) receipt of the unique message. This information informs the instructions that they should take some additional actions in order to communicate the new encryption key or that they should, in response to policy, remove the identified non-responsive members from the VPN.

In an embodiment, at 221, the instructions may selectively receive acknowledgements from a number of the members, where each acknowledgement includes the sequence number discussed above with the embodiment described at 214. Each received acknowledgment is matched via its sequence number to a particular VPN key change message and the identity of the proper VPN member obtained from the IP address of the acknowledgement. This provides one mechanism for the instructions to maintain records to identify which members have and have not received the new and changed communication encryption key.

Similar to what was discussed above with respect to the key distribution service represented by the method 100 of the FIG. 1, the instructions may use policy, events, conditions, and/or operating configurations to decide what action or actions to take in the event that a member does not acknowledge receipt of a changed communication encryption key.

For example, the instructions may set a timer and when the timer pops or generates an alarm the instructions decide whether a particular member or group of members have or have not acknowledged receipt of the changed encryption key embedded in the unique message. If no acknowledgement is received, then another message may be sent and the process may iterate for some configurable number of attempts. If a threshold is reached, policy may dictate that a non responding member be removed from the VPN. In some cases notifications may be sent to other members or to a select administrator informing the members or the administrator that one or more members are being removed for non responsiveness.

It may also be the case that a non responding member is disconnected from the network or powered off for some extended period of time. This lapse from the network may in fact be legitimate. Thus, if the instructions are able to determine this to be the case, such as through some automated email notification indicating that a particular member is out of the office for an extended period of time or through another mechanism, then the instructions may have exceptions that permit the non responding member to remain an active participant within the VPN until the instructions believe that the member can be contacted and should respond to a changed encryption key message. Thus, the actions for removing members can be made flexible to accommodate practical considerations.

Figure 3:
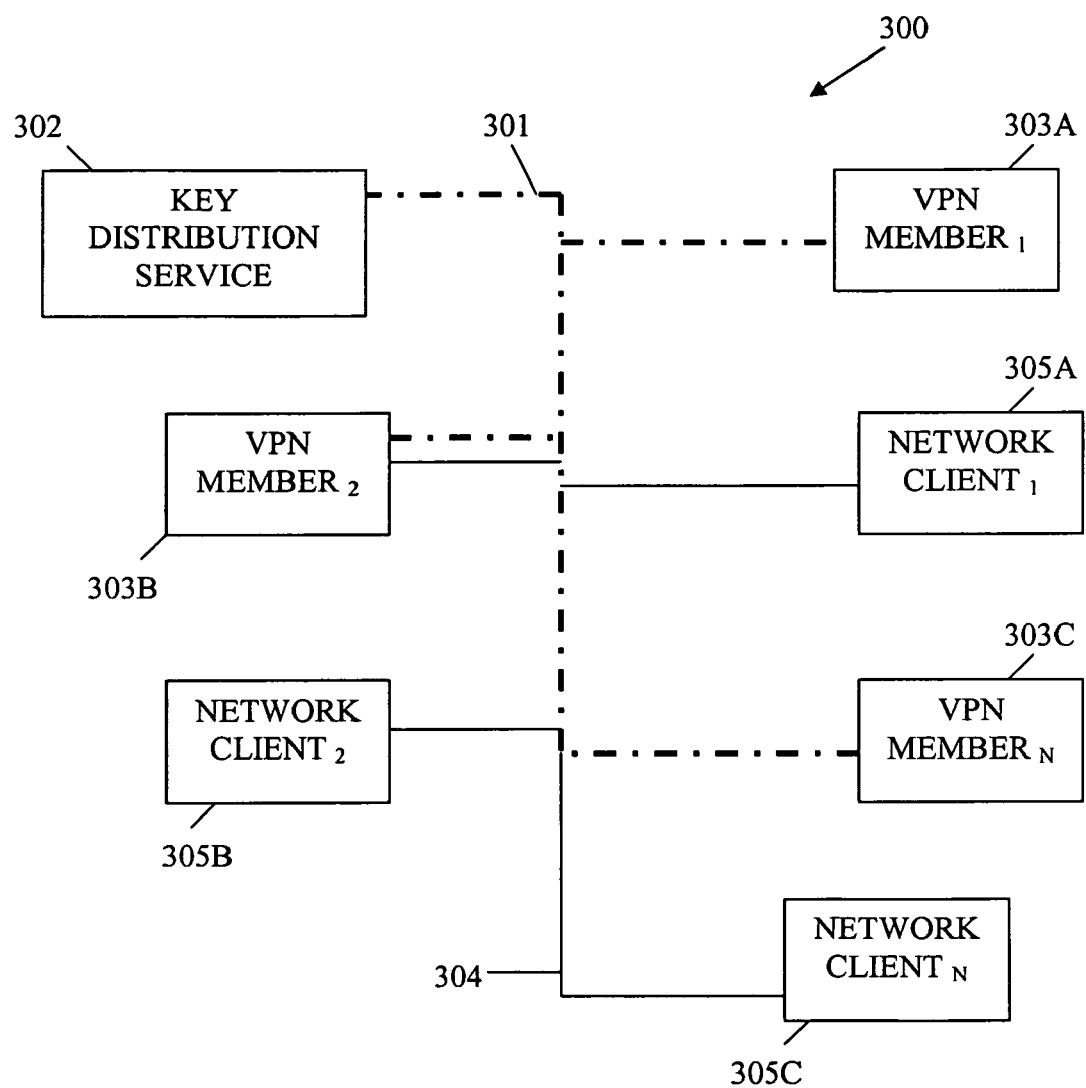
FIG. 3 is a diagram of a VPN key distribution system, according to an example embodiment.

FIG. 3 is a diagram of a VPN key distribution system 300, according to an example embodiment. The VPN key distribution system 300 is implemented within a machine-accessible and readable media of a machine. In an embodiment, the VPN key distribution system 300 implements, among other things, the methods 100 and 200 of the FIGS. 1 and 2, respectively.

The VPN key distribution system 300 includes a VPN 301 and a key distribution service 302. The VPN 301 includes a plurality of VPN members 303A-303C and the VPN 301 operates within a network 304, which has a variety of network clients 305A-305C that are not participating within the VPN 301. Each of these will now be discussed in turn.

The VPN 301 is logically carved out over the network 304. The network 304 may be any Local Area Network (LAN), Metropolitan Area Network (MAN), or Wide Area Network (WAN) that is wired, wireless, or a combination of wired and wireless. In an embodiment, the network 304 is the Internet.

The VPN 301 uses secure communication techniques such as custom data encryption to communicate with its VPN members 303A-303C. The custom encryption uses an encryption scheme driven by a particular encryption key. Furthermore, to prevent any particular key from being exposed on the network 304 for any extended period of time, the key is frequently changed. The rate at which a key is changed or the event or condition that may drive a key change may be managed by the key distribution service 302 and may be driven by policy.

The key distribution service 302 is a unique VPN member that manages and communicates encryption key changes for the VPN 301. The key distribution service 302 may also monitor and log actions of the VPN 301. According to an embodiment, the key distribution service 302 may be viewed as the key distribution service represented by the method 100 of the FIG. 1 or the instructions represented by the method 200 of the FIG. 2.

The key distribution service 302 determines based on policy, event, or condition that the VPN 301 is to have a new encryption key communicated and enforced with the VPN members 303A-303C within the VPN 301. This results in a unicast or individual message being constructed for each member 303A-303C and individually sent over the network 301 to each member 303A-303C.

The message communicates the new encryption key for use within the VPN 301. Each message may be encrypted. The encryption may be customized for each particular member 303A-303C or it may be known to the members 303A-303C as a whole. In some cases, each message may also be digitally signed by the key distribution service 302.

Once each message is sent, the key distribution service 302 sets a timer and waits to see if an acknowledgement is received from a particular member 303A-303C once the timer pops or generates an alarm. If an acknowledgement is received, then a sequence number embedded in the acknowledgement may permit the key distribution service 302 to associate the received acknowledgement with a particular key change message and VPN 301 and also the specific identities of the of the members 303A-303C may be obtained from IP addresses of each received acknowledgement. If an acknowledgement is not received then a message may be resent for some configured or policy-driven amount of iterations until either an acknowledgement is received or a determination is made based on policy to remove a particular non responsive member 303A-303C.

The key distribution service 302 maintains records to indicate which of the members have and have not received the unique message having the new encryption key. The key distribution service 302 also enforces policy and evaluates conditions and events to determine when it is appropriate to notify an administrator or other ones of the members 303A-303C about a particular non responsive member 303A-303C or when it is appropriate to remove a non responsive member 303A-303C entirely from a list of valid members 303A-303C associated with the VPN 301.

Figure 4:
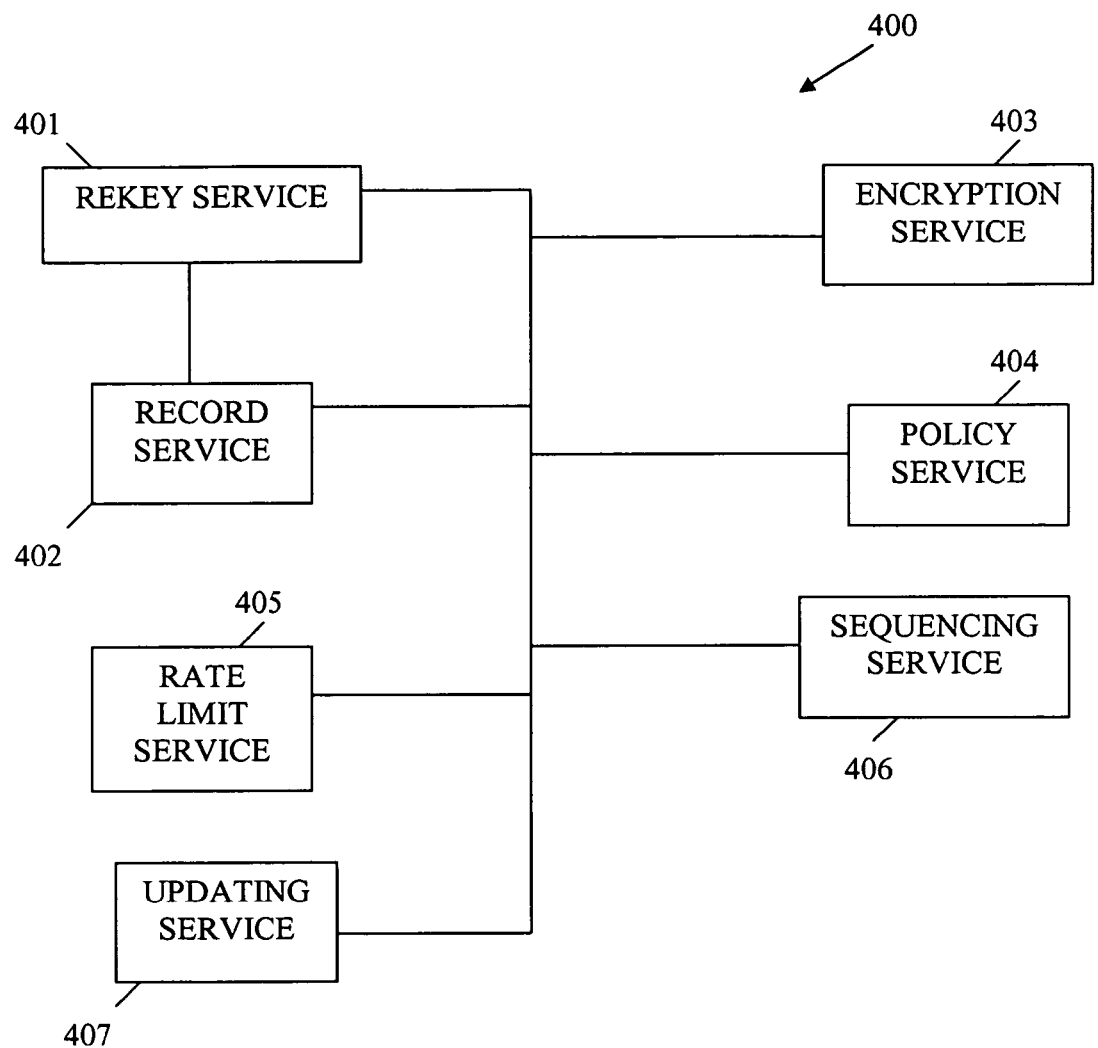
FIG. 4 is a diagram of another VPN key distribution system, according to an example embodiment.

FIG. 4 is a diagram of another VPN key distribution system 400, according to an example embodiment. The VPN key distribution system 400 is implemented in a machine-accessible and readable medium and is accessible over a network. The network may be wired, wireless, or a combination of wired and wireless. The VPN key distribution system 400 presents an alternative arrangement to that which was presented with the VPN key distribution system 300 represented and discussed within the context of the FIG. 3.

The VPN key distribution system 400 includes a rekey service 401 and a record service 402. In some embodiments, the VPN key distribution system 400 may also include an encryption service 403, a policy service 404, a rate limit service 405, a sequencing service 406, and/or an updating service 407. Each of these will now be discussed in turn.

The rekey service 401 is implemented within software instructions as a means for sending a new encryption key to members of a VPN. The software instructions may be a single module or a variety of modules that cooperate with one another. The rekey service 401 makes a determination as to when it is appropriate to change a communication encryption key within the VPN for the members. Once a decision is made a new encryption key is generated and the new encryption key is sent individually as a separate message to each member of the VPN. In some embodiments, this is achieved by sending a unicast message to each of the members of the VPN.

The record service 402 is also implemented within software instructions as a means for maintaining records to indicate which of the members of the VPN have successfully received the new encryption key from the rekey service 401 and which of the members have not yet received the new encryption key. Again, the software instructions may be implemented as a single module or as a series of independent modules that cooperate with one another.

According to an embodiment, the VPN key distribution system 400 may also include an encryption service 403. The encryption service 403 is implemented within software instructions as a means for encrypting each of the unique messages that have the new encryption key being communicated via separate messages to each of the VPN members via the rekey service 401. The encryption service 403 permits the rekey service 401 to encrypt the unique messages that are sent to each of the members of the VPN.

The encryption of the messages may be based on public-private key encryption and customized for each receiving member of the VPN. Alternatively, the encryption may be based on a secret known to the group of members as a whole. The encryption is different from the encryption being used within the VPN and such unique encryption may be used, in some cases, by the individual members to identify a communication from the rekey service 401. The encryption service 403 may also providing signing capabilities to the rekey service 401, such that each message is signed by the rekey service 401. This may add to the assurances of the members that the rekey message is legitimate and is from whom it purports to be from.

The VPN key distribution system 400 may also include a policy service 404. The policy service is also implemented as software instructions as a means for deciding whether to remove select members from the VPN due to their perceived unresponsiveness to the key message being sent from the rekey service 401. The policy service 404 may interact with both the rekey service 401 and the record service 402. The policy service provides dynamic and real-time evaluation of policy. This permits the record service 402 to determine when a particular non responsive member is to be removed from the VPN and may permit the record service 402 to determine when and how often the rekey service 401 should be contacted to attempt to resend a new message to non responsive members.

According to still another embodiment, the VPN key distribution system 400 includes a rate limit service 405. The rate limit service 405 is implemented within software instructions as a means for determining a rate at which each unique message is sent out to the members of the VPN. The rate limit service 405 interacts with the rekey service 401 and perhaps the policy service 404. The rate limit service 405 instructs the rekey service 401 as to the rate at which messages are sent out to the members. This ensures that a rate that the record service 402 must process to handle acknowledgements is controllable and in a desired range.

According to an embodiment, the VPN key distribution system 400 may also include a sequencing service 406. The sequencing service 406 is implemented within software instructions as a means for assigning a sequence number to each new key message, where any particular sequence number is associated with a key change of the VPN. The sequencing service 406 interacts with the rekey service 401 and perhaps the policy service 404 and supplies mappings for sequence numbers to particular VPN's and their key change messages. Identities of responding members to key change messages can be gleaned from the IP addresses of the acknowledgements. A message generated with a new encryption key by the rekey service 401 includes a sequence number, and the record service 402 processes acknowledgements from the members that include the sequence number. In this way, the sequencing service 406 may also interact with the record service 402 and provides a mechanism for managing who has and has not received the new encryption key sent from the rekey service 401.

In another embodiment, the VPN key distribution system 400 includes an updating service 407. The updating service 407 is implemented within software instructions as a means for updating records in response to acknowledgments received from the members, where each acknowledgment includes the sequence number for a particular key change message of the VPN and includes the IP address of a particular VPN member. Essentially, the updating service 407 interacts with the record service 402 and perhaps the sequencing service 406 and permits proper records to be maintained as to which members of the VPN have and have not received the new encryption key.

It is now appreciated how VPN rekeying may be achieved in a more globally accessible manner that is more processing efficient. This is done via unicasting individual rekey messages and tracking acknowledgments from the individual members to determine when the members have and have not received the changed encryption key for the VPN.

Figure 5:
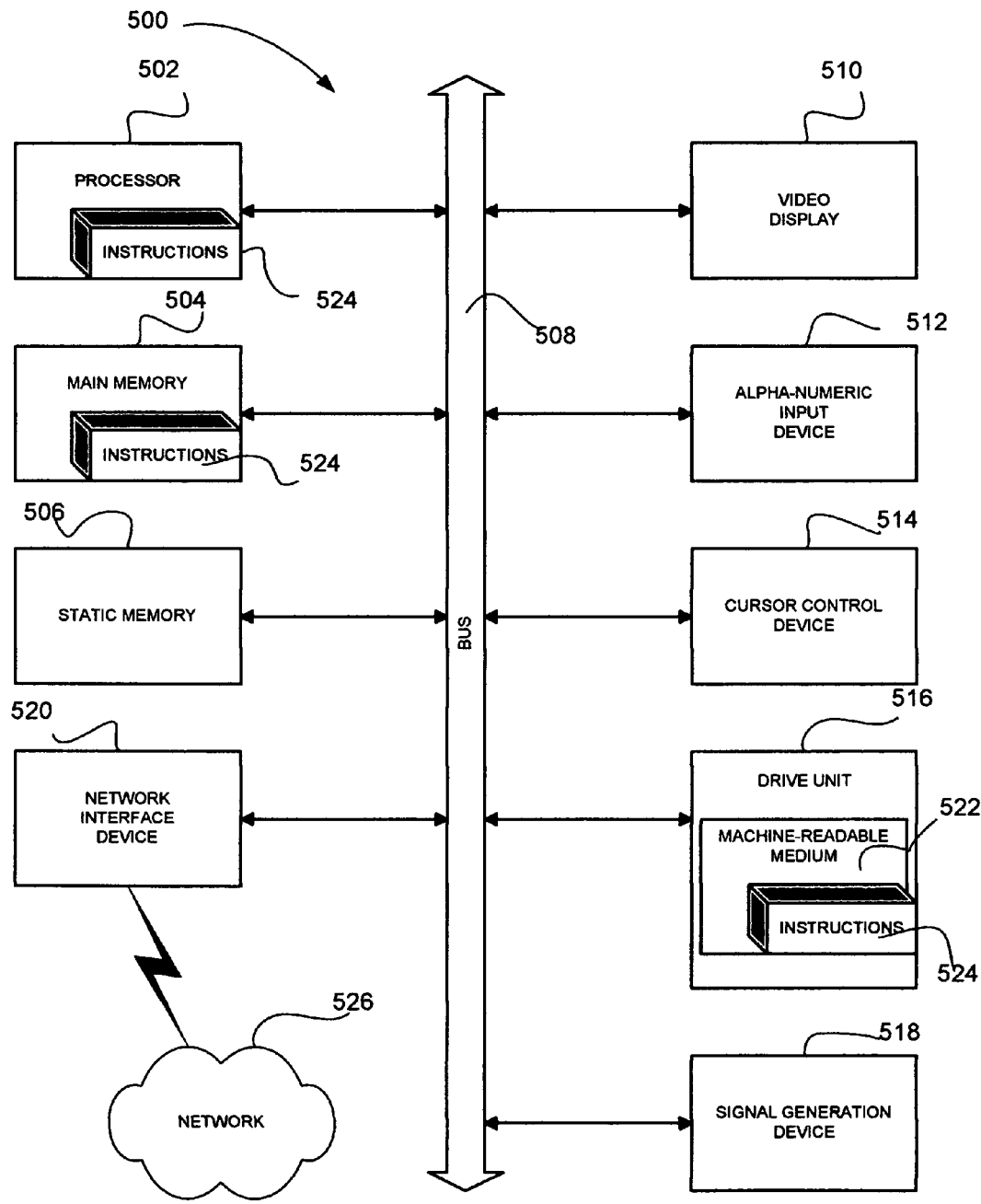
FIG. 5 is a schematic diagram of a machine having instructions for processing methods discussed herein, according to an example embodiment.

FIG. 5 is a schematic diagram of a machine having instructions 524 for processing methods 100 and 200 discussed herein, according to an example embodiment.

Thus, FIG. 5 shows a diagrammatic representation of machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
monitoring a virtual private network;
determining to distribute a new communication encryption key to members of the virtual private network, the virtual private network a mesh configuration of devices each device associated with a particular member of the virtual private network;
individually sending a unicast message to each member with the new encryption key, the unicast message sent via a point-to-point communication to each member of the VPN; and
tracking select members who have acknowledged receipt of the new encryption key, wherein a particular acknowledgement from each member is tracked and when a particular member fails to send its particular acknowledgement and after a configurable number of attempts to resend the encrypted different encryption key, determining, via automated mechanism, that the particular member is disconnected from the VPN for an extended period of time; and
permitting the particular member to remain an active participant in the VPN until the member can acknowledge receipt of the new encryption key.

2. The method of claim 1, wherein individually sending further includes regulating a rate at which each unicast message is sent to control a response rate for which acknowledgements are received from the members.

3. The method of claim 1, wherein tracking further includes recording a sequence number associated with each acknowledgement received to identify the new encryption key, and wherein identities for the members are acquired with each acknowledgement.

4. A method, comprising:
monitoring a virtual private network (VPN);
directly sending a unique message to each member of the VPN, a new encryption key is included in the unique message for use in communications among the members within the VPN and each member is instructed to begin immediately using the new encryption key within the VPN, the VPN a mesh configuration of devices and each member associated with a particular device, each unique message sent to each member via a point-to-point communication; and maintaining records to identify which of the members have successfully received the unique message and which of the members have not successfully received the unique message;

determining, via automated mechanism, that a particular member is disconnected from the VPN for an extended period of time; and permitting the particular member to remain an active participant in the VPN until the member can acknowledge receipt of the new encryption key.

5. The method of claim 4, wherein directly sending further includes controlling the rate at which the unique message is sent out.

6. The method of claim 4, wherein directly sending further includes unicasting each unique message over a network to each of the members.

7. The method of claim 4, wherein directly sending further includes encrypting each unique message before sending to each of the members.

8. The method of claim 4, wherein directly sending further includes associating a sequence number with each unique message that permits each sequence number to be associated with the new encryption key.

9. The method of claim 8, wherein maintaining further includes selectively receiving acknowledgments from a number of the members, wherein the acknowledgments include the identities of responding members permitting the responding members to be identified and to be noted within the records as having properly received the unique message with the new encryption key.

10. A system, comprising:
a virtual private network (VPN) represented on a mesh configuration of network devices; and
a key distribution service, the VPN includes a group of members each member associated with a particular network device and the VPN is to use encryption for communications between the members of the group, the key distribution service monitors the VPN, and the encryption is defined by a key, and the key distribution service is to distribute a changed key for the VPN to the group by messages that are individually sent to each of the members of the group as separate individual point-to-point communications between the key distribution service and each member of the VPN, wherein each message is custom encrypted for each member and digitally signed by the key distribution service, and wherein the key distribution service is configured to determine, via automated mechanism, that a particular member is disconnected from the VPN for an extended period of time and permit the particular member to remain an active participant in the VPN until the member can acknowledge receipt of the new encryption key.

11. The system of claim 10, wherein the key distribution service is to unicast the changed key within the messages to each of the members of the group.

12. The system of claim 10, wherein the key distribution service is to maintain records indicating which of the members have been sent the changed key and which of the members have and have not acknowledged the changed key.

13. The system of claim 10, wherein the key distribution service is to evaluate policy to determine a rate for individually sending the messages to the members of the group.

14. The system of claim 10, wherein the key distribution service is to evaluate policy to determine when and if subsequent messages with the changed key are to be resent to a number of the members that appear to be unresponsive.

* * * * *